(12) United States Patent
Hubert

(10) Patent No.: US 6,422,302 B1
(45) Date of Patent: Jul. 23, 2002

(54) HEAT EXCHANGER, IN PARTICULAR MOTOR VEHICLE CONDENSER AND METHOD FOR MAKING SAME

(75) Inventor: Sylvain Hubert, Reims (FR)

(73) Assignee: Valeo Thermique Moteur, La Verriere (FR)

( * ) Notice: Subject to any disclaimer, the term of this patent is extended or adjusted under 35 U.S.C. 154(b) by 0 days.

(21) Appl. No.: 09/463,265

(22) PCT Filed: May 19, 1999

(86) PCT No.: PCT/FR99/01187

§ 371 (c)(1),
(2), (4) Date: Jan. 21, 2000

(87) PCT Pub. No.: WO99/61859

PCT Pub. Date: Dec. 2, 1999

(30) Foreign Application Priority Data

May 25, 1998 (FR) .............................................. 98 06546

(51) Int. Cl.[7] .............................................. F28F 9/007
(52) U.S. Cl. ...................................... 165/67; 228/173.1
(58) Field of Search ........................... 165/67; 248/232; 228/173.1

(56) References Cited

U.S. PATENT DOCUMENTS

| | | | | |
|---|---|---|---|---|
| 4,878,284 A | * | 11/1989 | Sawdon | ..................... 29/243.53 |
| 5,027,503 A | * | 7/1991 | Sawdon | ......................... 29/798 |
| 5,069,275 A | * | 12/1991 | Suzuki et al. | ................... 165/67 |
| 5,183,103 A | * | 2/1993 | Tokutake | ...................... 165/67 |
| 5,603,153 A | | 2/1997 | Zmyslowski | |

FOREIGN PATENT DOCUMENTS

| | | | | |
|---|---|---|---|---|
| EP | 0 440 400 | | 8/1991 | |
| EP | 0 484 004 | | 5/1992 | |
| JP | 4353396 A | * | 12/1992 | ................... 165/67 |

\* cited by examiner

*Primary Examiner*—Allen Flanigan
(74) *Attorney, Agent, or Firm*—Morgan & Finnegan, LLP

(57) ABSTRACT

The invention concerns a heat exchanger comprising at least a manifold and a fixing lug attached to the manifold by a mechanical linkage obtained by clinching. The invention also concerns a method for making such a heat exchanger comprising a step for clinching the fixing lug on the manifold before making them definitely integral for furnace soldering. The invention is particularly applicable when the heat exchanger is an air conditioning condenser for a motor vehicle.

29 Claims, 2 Drawing Sheets

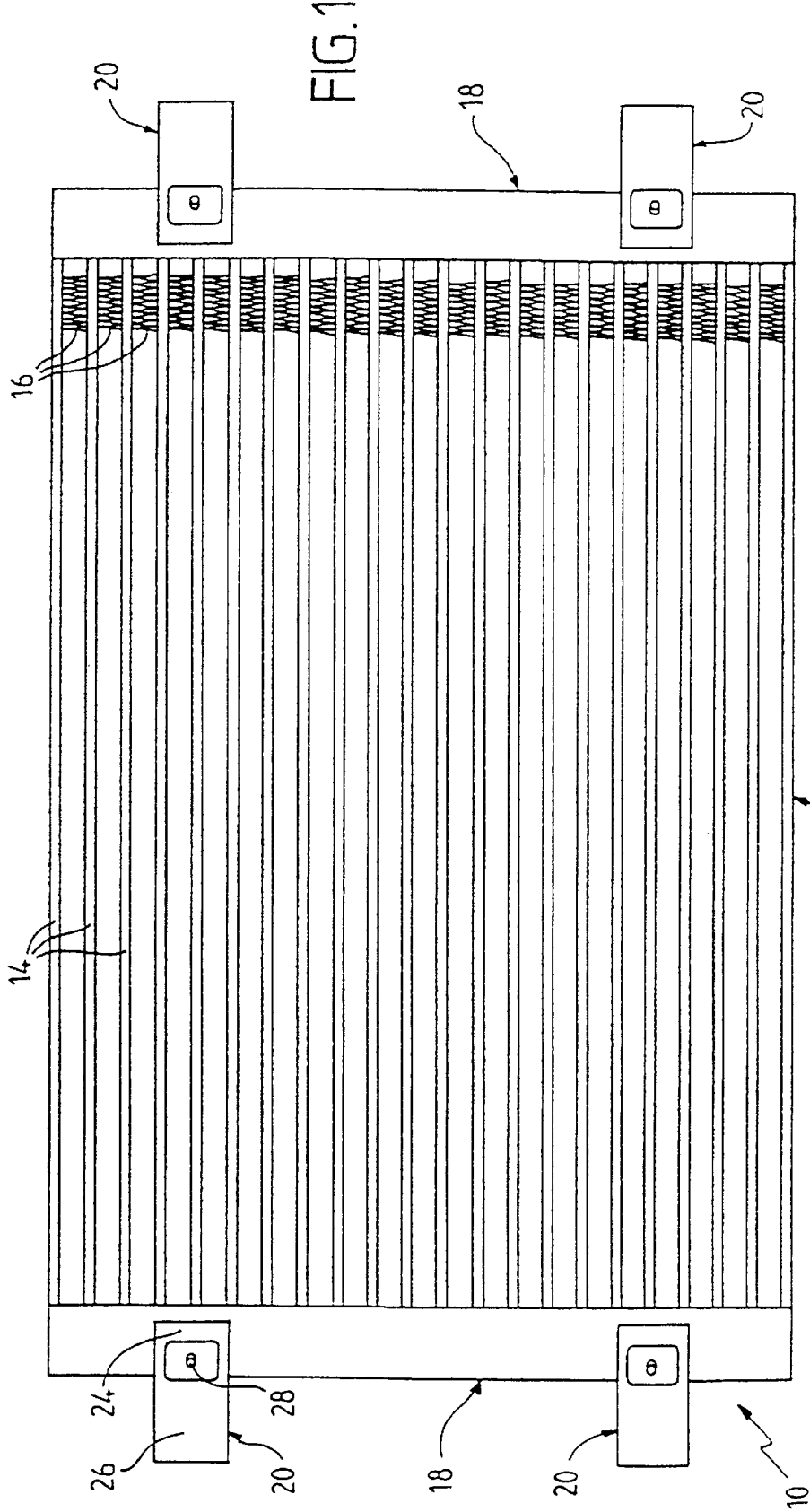
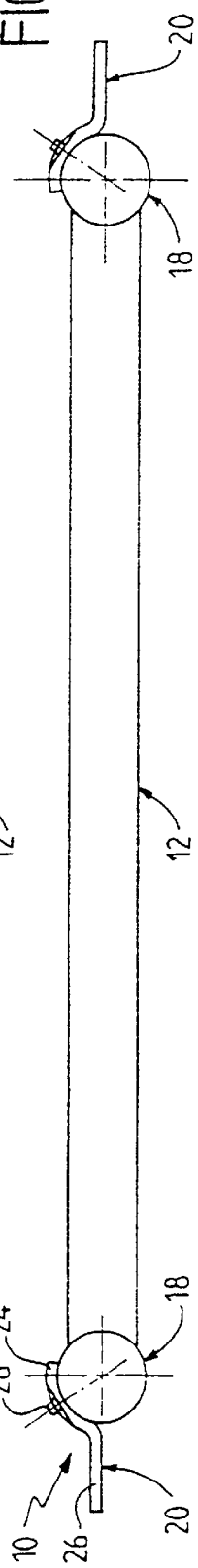

HEAT EXCHANGER, IN PARTICULAR MOTOR VEHICLE CONDENSER AND METHOD FOR MAKING SAME

FIELD OF THE INVENTION

The invention relates to a heat exchanger, in particular for a motor vehicle, as well as a method for its manufacture.

The invention more particularly relates to a heat exchanger comprising at least one manifold and at least one fixing lug for each manifold. The fixing lug comprises a concave contact zone, of a shape adapted to the positioning of the said fixing lug on an outer peripheral surface of the manifold, and an attachment zone that extends radially outward from the manifold.

BACKGROUND OF THE INVENTION

A heat exchanger may form, for example, a condenser that is capable of forming part of an air conditioning installation for a motor vehicle.

A heat exchanger typically is fixed, by means of its fixing lugs, to the environment which surrounds it. In the particular case of an air conditioning condenser, it is habitually fixed either to the structure of the vehicle or to the cooling radiator of the engine of the vehicle.

Conventionally, the fixing lugs and the manifold are metallic and joined by welding in an atmosphere of an inert gas. But such a welding operation has a series of drawbacks: it is expensive, it requires a qualified operator, it can only be performed at a low speed that is inadequate on an industrial scale, and moreover the quality of the resultant joint is unsatisfactory.

The production of the joint by soldering is also known, which necessitates the provision of means to retain and index the fixing lugs on the heat exchanger before and during the soldering operation, which is performed in a suitable furnace.

Known, in particular from document EP-0 440 400, is a heat exchanger of the above-mentioned type, which comprises a heat exchanger body and fixing devices that are fixed to the heat exchanger body. The heat exchanger body comprises flat tubes and fins that are stacked alternately, as well as two hollow manifolds to which the ends of the flat tubes are connected in fluid communication.

The fixing devices illustrated in the above mentioned document each comprise a contact portion, of concave shape, fitting to the outer peripheral surface of a manifold and placed in close contact with the manifold, as well as a fixing portion that extends outwardly from one end of the concave portion and forms a bent-back hook.

The above-mentioned document discloses that this bent-back hook is inserted between two adjacent tubes so that the fixing devices are welded to the body of the heat exchanger and are made integral with the heat exchanger.

In a refinement described in the above-mentioned document, a hole is pierced in the hollow manifold, whereas the fixing lug is punched so as to force back material and form a centring cone in the hole produced in this manner. In another refinement, a hole is pierced in the fixing lug and it is the hollow manifold which is punched.

The heat exchanger according to the above-mentioned document has a certain number of drawbacks. The fixing lug is susceptible to undesirable micro-displacements which can cause poor tightness as well as burrs at the moment of welding. Moreover, the presence of perforations either in the manifold or in the fixing lug may result in leaks and/or infiltrations. Furthermore, the necessity for an anchoring hook to limit the displacements in relation to the fixing lug and the manifold before the welding operation complicates the production of the fixing lug and its assembly.

BRIEF SUMMARY OF THE INVENTION

The object of the invention is particularly to overcome the above-mentioned drawbacks.

In particular it relates to procuring a heat exchanger in which the or each fixing lug may be pre-fitted and kept in a precise position before and during the permanent assembly operation that is performed by soldering or welding.

For this purpose the invention proposes a heat exchanger of the type defined in the introduction, in which the concave contact zone of the fixing lug has a central region of reduced thickness in relation to the normal thickness of the fixing lug, so as to produce a mechanical linkage by clinching, joining the concave contact zone of the fixing lug to the outer peripheral surface of the manifold.

Thus, the fixing lug is pre-fitted to the manifold by a so-called clinching operation, performed by drawing and pressing.

This clinching produces a mechanical linkage by cooperation between the shapes of the manifold and the fixing lug. It permits perfect retention and indexing before and during the furnace soldering operation. The risk of micro-displacements is thus avoided in a particularly effective manner.

Furthermore, this operation may be performed particularly quickly, without requiring a piercing stage as in the prior art.

According to yet another characteristic of the invention, the manifold of the heat exchanger has, in the concave contact zone with the fixing lug, a blind recess delimited by an upper base which is connected to a lateral wall of the recess by a concave shoulder over a chosen depth.

The fixing lug preferably comprises at least one hole previously made to facilitate the subsequent production of the central region of reduced thickness, thanks to the fact that the material of the lug will partially fill this hole whilst limiting the deformation of the lug.

The invention applies in particular to a heat exchanger comprising two manifolds and at least one fixing lug for each manifold.

Such a heat exchanger may be produced in particular in the form of a condenser.

From another angle, the invention relates to a method for the manufacture of such a heat exchanger comprising, for each fixing lug, the steps comprising positioning the said concave contact zone of the fixing lug on the outer peripheral surface of a manifold, then clinching the fixing lug onto the manifold, and finally permanently joining the assembly, for example by furnace soldering.

BRIEF DESCRIPTION OF THE DRAWING

In the following description, given only by way of example, reference is made to the attached drawings, on which:

FIG. 1 is a front view of a heat exchanger, of the condenser type, produced in accordance with the invention;

FIG. 2 is a top view of the heat exchanger of FIG. 1;

DETAILED DESCRIPTION OF THE INVENTION

Figure 3:
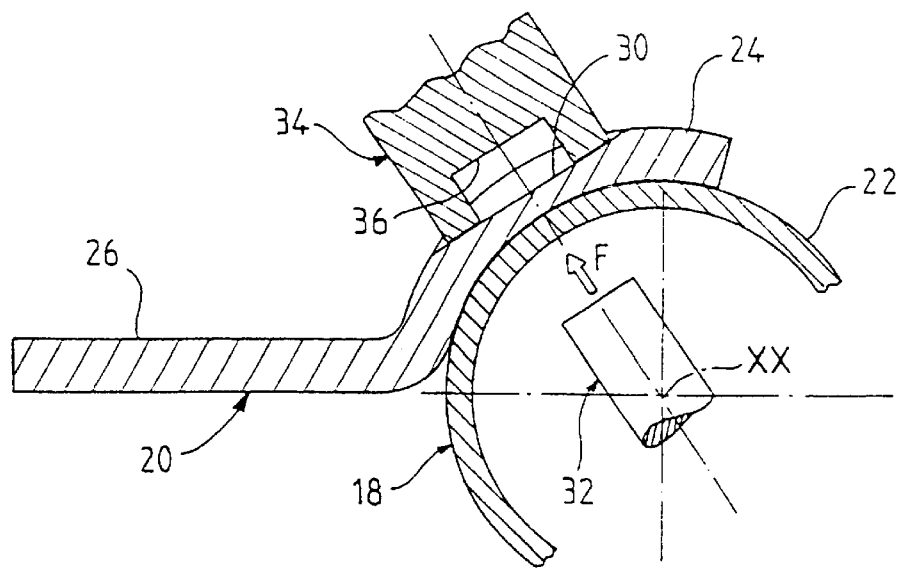
FIG. 3 is a partial sectional view showing a manifold and a fixing lug before assembly.
Figure 4:
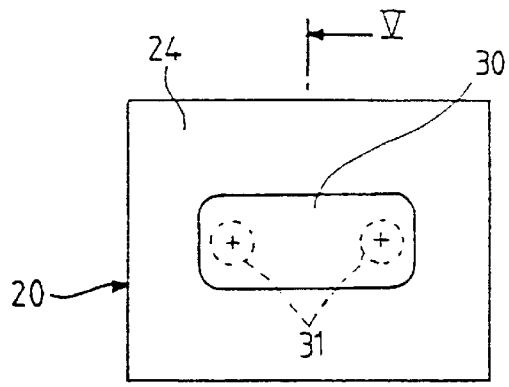
FIG. 4 is a partial top view of a fixing lug, represented flat, in the region of its contact zone.

Reference is first made to FIGS. 1 and 2 which represent a heat exchanger 10, here produced in the form of a condenser capable of forming part of an air conditioning installation for a motor vehicle. The condenser 10 is generally formed by a core 12 formed by an alternate stack of flat tubes 14 and fins 16 having an undulating shape. The flat tubes 14 of the core 12 are connected to two manifolds 18, into which they open through suitable apertures. The condenser is suitable for a coolant in gaseous form to flow through, which is condensed by heat exchange with a flow of air which sweeps the core, in a manner known in the art of the invention.

The condenser 10 comprises four fixing lugs 20 fixed in pairs onto the two manifolds 18. These lugs are intended to allow the attachment of the condenser 10 to its environment, for example to the structure of a motor vehicle or onto the cooling radiator of the engine of the vehicle.

In the example, the tubes 14, the fins 16, the manifolds 18 and the fixing lugs 20 are formed from a metal sheet having an aluminium base.

The manifolds 18 have a tubular shape and in the example illustrated are delimited by a circular cylindrical wall that has an outer peripheral surface 22 (see FIG. 3). Each of the fixing lugs 20 comprises a concave contact zone 24 with a shape adapted to the positioning of the fixing lug on the outer peripheral surface 22 of the manifold. Each of the lugs also comprises an attachment zone 26 that extends radially away from the manifold and is capable of being fixed, in a suitable manner, to the environment of the condenser.

A mechanical linkage 28 produced by clinching joins the concave contact zone 24 of the fixing lug 20 to the outer peripheral surface 22 of the manifold.

The clinching is a mechanical operation that consists of locally deforming the material of two metallic pieces, for example two sheets that are disposed one against the other to join them mechanically. Such an operation essentially comprises a drawing and a pressing which produce a mechanical linkage between the two pieces by cooperation of shapes.

Reference is now made to FIGS. 3 to 7 to describe more particularly the mounting of a fixing lug onto a manifold by a clinching operation.

Figure 5:
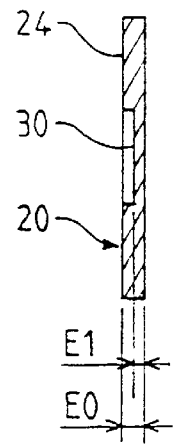
FIG. 5 is a sectional view along line V—V of FIG. 4.
Figure 6:
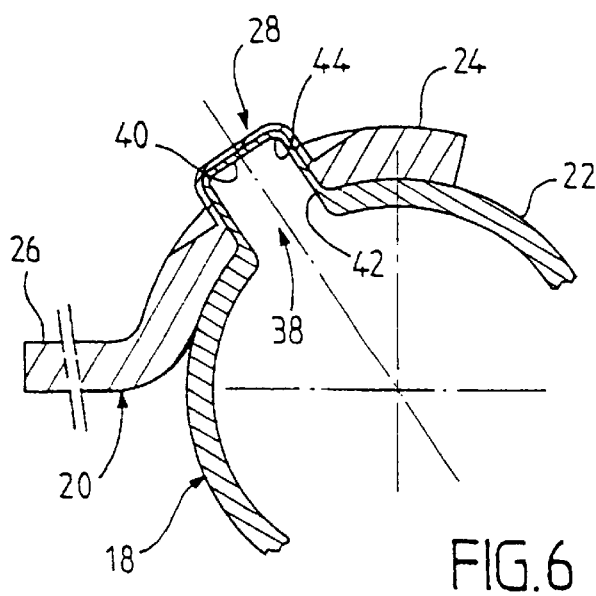
FIG. 6 is a similar view to FIG. 3, after joining by clinching.
Figure 7:
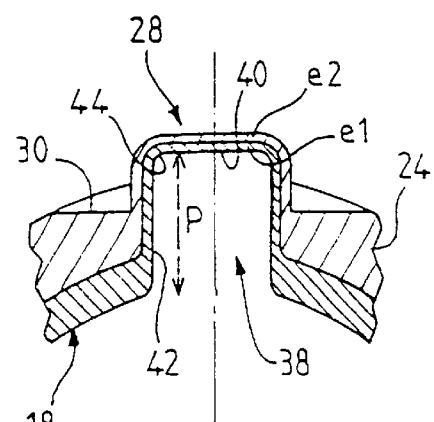
FIG. 7 is a detail, represented on a larger scale, of FIG. 6.

The contact zone 24 of the fixing lug comprises a central region 30, in the example a rectangular shape, having a reduced thickness E1 in relation to the normal thickness E0 of the lug (FIG. 5). In fact, the thickness of the fixing lug, in the region which has to be deformed by clinching, must not to be too large, as then the clinching operation would be made difficult. It is therefore desirable to specify a central region 30 of reduced thickness, whilst retaining a greater thickness for the remainder of the fixing lug, so as to bestow good mechanical strength.

The central region 30 of reduced thickness is advantageously obtained by a press deformation of the fixing lug. In this respect, it is advantageous to produce beforehand, i.e. before press deformation, at least one hole that passes through the thickness of the lug in the region where the central region 30 has to be formed.

The purpose of such a hole is to facilitate the production of the central region of reduced thickness since the material of the lug will partially fill this hole while limiting the deformation of the lug. This filling is performed during the pressing of the material towards the hole.

Thus, in the example, two holes 31 (represented in broken lines on FIG. 4) may optionally be provided on either side of the site where the clinching will be performed.

As can be seen on FIG. 3, the concave contact zone 24 of the fixing lug 20 is applied against the outer peripheral surface 22 of the manifold 18 in a chosen position. Then a clinching operation is performed by using a punch 32 and a drawing die 34 that are able to be brought closer to one another. In the example, the drawing die 34 is applied against the central region 30, whereas the punch 32 is moved perpendicularly to the longitudinal axis X-X of the manifold, from the interior of the manifold, and in the direction of the drawing die 34, as shown by the arrow F on FIG. 3. The drawing die 34 comprises a hollow portion 36 having a shape adapted to the punch 32 and disposed opposite the said punch.

The punch 32 is moved in the direction of the arrow F by a suitable mechanical means which causes a local deformation of the wall of the manifold and of the central region 30 of the concave contact zone of the fixing lug.

The displacement of the punch 32 successively causes a drawing and a pressing of the wall of the manifold and the central region 30 of reduced thickness of the fixing lug.

As a result the manifold 14 has, in the concave contact zone and the fixing lug, a blind recess 38 (FIGS. 6 and 7) delimited by an upper base 40 of circular shape connected to a lateral wall 42 of the recess by a concave shoulder 44 over a chosen depth P. In the region of the base 40 and the lateral wall 42, the manifold has a wall of reduced thickness e1, whereas the central region 30 of the fixing lug has a reduced thickness e2 (see detail on an enlarged scale on FIG. 7).

The fixing lug is thus prefitted to the manifold in a chosen indexed position, this pre-fitting being performed by a simple clinching operation that does not involve any perforation in the manifold or in the fixing lug. Once the fixing lugs have been joined by clinching to the corresponding manifolds, the unit can be soldered in a suitable furnace, without any risk of an even minimal displacement of the fixing lug in relation to the manifold.

Thus, the method of the invention ensures the indexing and the retention of the fixing lug of the manifold, whilst guaranteeing perfect temporary immobilisation not only during the transport of the condenser towards the soldering furnace, but also during the soldering operation, and without requiring the normal recourse to retention means.

Thanks to the method of the invention, remarkable tightness and mechanical strength are bestowed upon the condenser produced in this manner whilst preventing any microdisplacement in relation to the fixing lugs before and during soldering.

Of course, the invention is not limited to the embodiment described above by way of example and it extends to other refinements.

Thus, although the invention has been described with particular reference to an air conditioning condenser for a motor vehicle, it may be applied to other types of heat exchangers.

What is claimed is:

1. A heat exchanger comprising at least one manifold having an outer peripheral surface and at least one fixing lug for each manifold, each fixing lug having a general thickness and comprising a concave contact zone adapted for the positioning of the fixing lug on a portion of the outer peripheral surface of the manifold and an attachment zone extending radially away from the concave contact zone, wherein the concave contact zone of the fixing lug has a central region of reduced thickness in relation to the general thickness of the fixing lug, the concave contact zone of the fixing lug having a mechanical linkage produced by clinching that joins the concave contact zone to said portion of the outer peripheral surface of the manifold.

2. A heat exchanger according to claim 1, wherein said portion of the outer peripheral surface of the manifold and the concave contact zone of the fixing lug each have a blind recess delimited by an upper base connected to a lateral wall of the recess by a concave shoulder, said recess a chosen depth.

3. A heat exchanger according to claim 1, wherein the fixing lug comprises at least one hole previously made to facilitate the subsequent production of the central region of reduced thickness, such that said material comprising the fixing lug will partially fill said hole while limiting the deformation of the fixing lug during formation of the central region.

4. A heat exchanger according to claim 1, comprising two manifolds and at least one fixing lug for each manifold.

5. A heat exchanger according to claim 1, comprising a condenser.

6. A manufacturing process for a heat exchanger according to claim 1, comprising, for each fixing lug, the steps of:

positioning the concave contact zone of the fixing lug on the outer peripheral surface of the manifold;

clinching the fixing lug onto the manifold to form an assembly; and permanently joining the assembly.

7. A manufacturing process according to claim 6 wherein the step of permanently joining the assembly comprises soldering.

8. A heat exchanger according to claim 1 further comprising a tube, an end of the tube secured to and providing fluidic communication with the manifold;

a fin having an undulating shape, the fin positioned adjacent the tube and secured to the manifold.

9. A vehicle comprising the device of claim 1.

10. A heat exchanger comprising a manifold having an outer peripheral surface; and a fixing lug having a general thickness, the fixing lug comprising a curved contact zone having a central region of reduced thickness relative to the general thickness of the fixing lug, the curved contact zone clinched to a portion of the outer peripheral surface so as to form a mechanically linkage between the manifold and the fixing lug, and an attachment zone extending radially from the curved contact zone.

11. The heat exchanger according to claim 10 wherein each of said portion of the outer peripheral surface and said central region have a recess of a predetermined depth delimited by two lateral walls and a base connecting said lateral walls.

12. The heat exchanger according to claim 10 wherein the curved contact zone includes a hole that facilitates subsequent production of said central region of reduced thickness, said hole at least partially filling with the material comprising the curved contact zone and at least partially limiting the deformation of the curved contact zone during formation of said central region.

13. The heat exchanger according to claim 10 comprising two manifolds; and at least one fixing lug for each manifold.

14. A manufacturing process for a heat exchanger according to claim 10 comprising, for each fixing lug, the steps of:

positioning the concave contact zone on said portion of the outer peripheral surface;

clinching the fixing lug onto the manifold to form an assembly; and permanently joining the assembly.

15. The manufacturing process according to claim 14 wherein the step of permanently joining the assembly comprises soldering.

16. The manufacturing process according to claim 14 wherein the step of clinching comprises drawing and pressing the fixing lug and the manifold to produce a mechanical linkage between the fixing lug and the manifold.

17. A heat exchanger according to claim 10 further comprising a tube, an end of the tube secured to and providing fluidic communication with the manifold;

a fin having an undulating shape, the fin positioned adjacent the tube and secured to the manifold.

18. A vehicle comprising the device of claim 10.

19. A heat exchanger for a motor vehicle comprising:

two manifolds, each manifold having an outer peripheral surface;

a plurality of tubes, an end of each tube secured to and providing fluidic communication with ones of the manifolds;

a plurality of fins, each fin having an undulating shape, each fin positioned adjacent ones of the tubes and secured to the manifolds; and at least one fixing lug for each manifold, each fixing lug having a general thickness and comprising a curved contact zone having a central region of reduced thickness relative to the general thickness of the fixing lug, and an attachment zone extending radially from the curved contact zone, the curved contact zone including a hole that facilitates production of said central region, said hole at least partially filling with the material comprising the curved contact zone and at least partially limiting the deformation of the curved contact zone during formation of said central region, each curved central region clinched to a portion of the outer peripheral surface so as to mechanically link ones of the manifolds and the fixing lugs; and wherein each of said portion of the outer peripheral surface and said central region have a recess of a predetermined depth delimited by two lateral walls and a base connecting said lateral walls.

20. A manufacturing process for a heat exchanger according to claim 19 comprising, for each fixing lug, the steps of:

positioning the concave contact zone on said portion of the outer peripheral surface;

drawing and pressing the fixing lug and the manifold to produce a mechanical linkage between the fixing lug and the manifold and to form an assembly; and permanently joining the assembly.

21. A heat exchanger comprising:

a manifold having an peripheral surface; and a fixing lug having a contact zone with a region of reduced thickness relative to a general thickness of the contact zone, wherein a mechanical linkage joins the manifold and the fixing lug, the mechanical linkage comprising a protrusion in the peripheral surface of the manifold; and a corresponding protrusion in the region of reduced thickness of the contact zone.

22. The heat exchanger according to claim 21 wherein the mechanical linkage joining the peripheral surface and the region of reduced thickness forms a recess of a predetermined depth.

23. The heat exchanger according to claim 21 wherein the fixing lug further comprises an attachment zone extending radially from the contact zone.

24. The heat exchanger according to claim 21 wherein the mechanical linkage joining the peripheral surface of the manifold and the contact zone of the fixing lug is formed by a protrusion forming process in which corresponding regions of the manifold and the contact zone are concurrently deformed in the region of reduced thickness.

25. The heat exchanger according to claim 21 wherein the contact zone includes:

a hole that facilitates production of the region of reduced thickness, the hole at least partially filling and at least partially limiting the deformation of the contact zone during formation of the region of reduced thickness.

26. A manufacturing process for a heat exchanger according to claim 21 comprising the steps of:

positioning the contact zone of the fixing lug on the peripheral surface of the manifold;

concurrently deforming corresponding regions of the manifold and the fixing lug in the region of reduced thickness of the contact zone to form an assembly.

27. The manufacturing process according to claim 26 wherein the step of concurrently deforming comprises:

drawing and pressing the fixing lug and the manifold to produce the mechanical linkage.

28. The manufacturing process according to claim 26 further comprising the step of:

permanently joining the mechanical linkage.

29. A vehicle comprising the device of claim 26.

* * * * *